United States Patent
Rauschmayr et al.

(10) Patent No.: US 12,367,396 B1
(45) Date of Patent: Jul. 22, 2025

(54) AUTOMATIC FAILURE DIAGNOSIS AND CORRECTION IN MACHINE LEARNING MODELS

(71) Applicant: Amazon Technologies, Inc., Seattle, WA (US)

(72) Inventors: Nathalie Rauschmayr, North Vancouver (CA); Krishnaram Kenthapadi, Sunnyvale, CA (US); Dylan Slack, San Rafael, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1144 days.

(21) Appl. No.: 17/216,455

(22) Filed: Mar. 29, 2021

Related U.S. Application Data

(60) Provisional application No. 63/086,563, filed on Oct. 1, 2020.

(51) Int. Cl.
  *G06N 3/088* (2023.01)
  *G06N 3/045* (2023.01)

(52) U.S. Cl.
  CPC ............ *G06N 3/088* (2013.01); *G06N 3/045* (2023.01)

(58) Field of Classification Search
  CPC .......... G06N 3/088; G06N 3/045; G06N 3/08; G06N 3/04; G06N 3/063
  See application file for complete search history.

(56) References Cited

U.S. PATENT DOCUMENTS

2020/0394461 A1* 12/2020 Perera ................ G06N 7/01
2021/0073671 A1* 3/2021 Puri .................... G06N 3/084

OTHER PUBLICATIONS

Antoniou, A.; Storkey, A.; and Edwards, H. 2017. "Data Augmentation Generative Adversarial Networks". International Conference on Artificial Neural Networks and Machine Learning, arXiv preprint arXiv:1711.04340, 2017, pp. 1-14.

Booth, S.; Zhou, Y.; Shah, A.; and Shah, J., "Bayes- TrEx: Model Transparency by Example", eprint arXiv:2002.10248, Feb. 2020, pp. 1-29.

Carmon, Y.; Raghunathan, A.; Schmidt, L.; Liang, P.; and Duchi, J, "Unlabeled Data Improves Adversarial Robustness", arXiv:1905.13736v3 [stat.ML] Dec. 4, 2019, In Advances in Neural Information Processing Systems (NeurIPS), 2020, pp. 1-44.

Dumoulin, V.; Belghazi, I.; Poole, B.; Mastropietro, O.; Lamb, A.; Arjovsky, M.; and Courville, A., "Adversarially Learned Inference". Published as a conference paper at ICLR 2017, pp. 1-18.

(Continued)

*Primary Examiner* — Kamran Afshar
*Assistant Examiner* — Brian J Hales
(74) *Attorney, Agent, or Firm* — S. Scott Foster; Kowert, Hood, Munyon, Rankin & Goetzel, P.C.

(57) ABSTRACT

Automatic failure diagnosis and correction may be performed on trained machine learning models. Input data that causes a trained machine learning model may be identified in order to determine different model failures. The model failures may be clustered in order to determine failure scenarios for the trained machine learning model. Examples of the failure scenarios may be generated and truth labels for the example scenarios obtained. The examples and truth labels may then be used to retrain the machine learning model to generate a corrected version of the machine learning model.

20 Claims, 9 Drawing Sheets

(56) References Cited

OTHER PUBLICATIONS

Engstrom, L.; Ilyas, A.; Santurkar, S.; Tsipras, D.; Stein-hardt, J.; and Madry, A., "Identifying Statistical Bias in Dataset Replication", Proceedings of the 37th International Conference on Machine Learning, arXiv:2005.09619v2 [stat.ML] Sep. 2, 2020, pp. 1-35.

Feldman, M.; Friedler, S. A.; Moeller, J.; Scheidegger, C.; and Venkatasubramanian, S., "Certifying and Removing Disparate Impact", In Proceedings of the 21th ACM SIGKDD International Conference on Knowledge Discovery and Data Mining, KDD '15, pp. 259-268. New York, NY, USA: Association for Computing Machinery. ISBN 9781450336642. doi:10.1145/2783258.2783311. URL: https://doi.org/10.1145/2783258.2783311, 2015.

Gardner, M.; et al., "Evaluating Models' Local Decision Boundaries via Contrast Sets", In Findings of the Association for Computational Linguistics: EMNLP 2020, pp. 1307-1323. Online: Association for Computational Linguistics. doi:10.18653/v1/2020.findings-emnlp.117. URL https://www.aclweb.org/anthology/2020.findings-emnlp.117.

He, K.; Zhang, X.; Ren, S.; and Sun, J., "Deep Residual Learning for Image Recognition," 2016 IEEE Conference on Computer Vision and Pattern Recognition (CVPR) pp. 770-778.

Higgins, I.; Matthey, L.; Pal, A.; Burgess, C.; Glorot, X.; Botvinick, M. M.; Mohamed, S.; and Lerchner, A., "$\beta$-VAE: Learning Basic Visual Concepts with a Constrained Variational Framework". ICLR 2017 Conference Submission, pp. 1-22.

Ji, D.; Smyth, P.; and Steyvers, M., "Can I Trust My Fairness Metric? Assessing Fairness with Unlabeled Data and Bayesian Inference", In Advances in Neural Information Processing Systems, arXiv:2010.09851v1 [stat.ML] Oct. 19, 2020, pp. 1-27.

Kang, D.; Raghavan, D.; Bailis, P.; and Zaharia, M., "Model Assertions for Debugging Machine Learning," Debugging Machine Learning Models, In NeurIPS MLSys Workshoppages, 2018 pp. 1-9.

Kingma, D. P.; Mohamed, S.; Jimenez Rezende, D.; and Welling, M., "Semi-supervised Learning with Deep Generative Models," In NIPS'14: Proceedings of the 27th International Conference on Neural Information Processing Systems—vol. 2, Dec. 2014 pp. 3581-3589.

Kumar, A.; Sattigeri, P.; and Fletcher, T., "Semi- supervised Learning with GANs: Manifold Invariance with Improved Inference," In NIPS'17: Proceedings of the 31st International Conference on Neural Information Processing Systems, Dec. 2017, pp. 5540-5550.

LeCun, Y.; Cortes, C.; and Burges, C., "Mnist handwritten digit database," ATT Labs [Online], Available: http://yann.lecun.com/exdb/mnist, 2010, pp. 1-7.

Lundberg, S. M.; and Lee, S.-I., :A Unified Ap proach to Interpreting Model Predictions,. In Advances in Neural Information Processing Systems 30, (NIPS 2017) pp. 4765-4774. Curran Associates, Inc. URL http://papers.nips.cc/paper/7062-a-unified-approach-to-interpreting-model-predictions.pdf. 2017.

Milz, S.; Rudiger, T.; and Suss, S., "Aerial GANeration: Towards Realistic Data Augmentation Using Conditional GANs," In Proceedings of the European Conference on Computer Vision (ECCV) Workshops, 2018, pp. 1-14.

Netzer, Y.; Wang, T.; Coates, A.; Bissacco, .; Wu, B.; and Ng, A. Y., "Reading Digits in Natural Images with Unsupervised Feature Learning," In NIPS Workshop on Deep Learning and Unsupervised Feature Learning, 2011, pp. 1-9.

Odena, A.; Olsson, C.; Andersen, D.; and Goodfellow, I., "TensorFuzz: Debugging Neural Networks with Coverage-Guided Fuzzing," Proceedings of the 36th International Conference on Machine Learning, PMLR 97: 2019, pp. 4901-4911. Long Beach, California, USA: PMLR. URL http://proceedings.mlr.press/v97/ odena19a.html.

Paszke, A.; Gross, S.; Chintala, S.; Chanan, G.; Yang, E.; DeVito, Z.; Lin, Z.; Desmaison, A.; Antiga, L.; and Lerer, A., "MNIST Example Pytorch," URL https://github.com/pytorch/examples, pp. 1-2, 2019.

Patel, K.; Fogarty, J.; Landay, J. A.; and Harrison, B., "Investigating Statistical Machine Learning as a Tool for Software Development,". In CHI '08: Proceedings of the SIGCHI Conference on Human Factors in Computing Systems, Apr. 2008, pp. 667-676, https://doi.org/10.1145/1357054.1357160.

Pedregosa, F.; et al., "Scikit-learn: Machine Learning in Python", Journal of Machine Learning Research 12: pp. 2825-2830, 2011.

Raghunathan, A.; Xie, S. M.; Yang, F.; Duchi, J.; and Liang, P., et al. "Understanding and Mitigating the Tradeoff between Robustness and Accuracy,". In Proceedings of the 37th International Conference on Machine Learning, PMLR 119: pp. 7909-7919, 2020.

Rajpurkar, P.; Zhang, J.; Lopyrev, K.; and Liang, P., "Squad: 100,000+ Questions for Machine Comprehension of Text," In Proceedings of the 2016 Conference on Empirical Methods in Natural Language Processing, pp. 2383-2392. Austin, Texas: Association for Computational Linguistics. doi:10.18653/v1/D16-1264. URL https://www.aclweb.org/ anthology/D16-1264, 2016.

Recht, B.; Roelofs, R.; Schmidt, L.; and Shankar, V., "Do ImageNet Classifiers Generalize to ImageNet?," vol. 97 of Proceedings of Machine Learning Research, pp. 5389-5400. Long Beach, California, USA: PMLR. URL:http://proceedings.mlr.press/v97/recht19a.html, 2019.

Ribeiro, M. T.; Singh, S.; and Guestrin, C., "Why should i trust you?" Explaining the predictions of any classifier, In KDD '16: Proceedings of the 22nd ACM SIGKDD International Conference on Knowledge Discovery and Data Mining, Aug. 2016 pp. 1135-1144, https://doi.org/10.1145/2939672.2939778.

Ribeiro, M. T.; Wu, T.; Guestrin, C.; and Singh, S., "Beyond Accuracy: Behavioral Testing of NLP Models with CheckList,". In Proceedings of the 58th Annual Meeting of the Association for Computational Linguistics, 4902-4912. Online: Association for Computational Linguistics, doi:10.18653/v1/2020.acl-main.442, URL https://www.aclweb. org/anthology/2020.acl-main.442. 2020.

Russakovsky, O., et al., "ImageNet Large Scale Visual Recognition Challenge,". International Journal of Computer Vision (IJCV) 115(3): pp. 211-252, doi: 10.1007/s11263-015-0816-y, 2015, preprint arXiv:1409.0575v2 [cs.CV] Dec. 1, 2014.

Sandfort, V.; Yan, K.; Pickhardt, P. J.; and Summers, R. M., "Data augmentation using generative adversarial networks (CycleGAN) to improve generalizability in CT segmentation tasks,". Scientific Reports 9(1):16884, ISSN 2045-2322, doi:10.1038/s41598-019-52737-x, URL https://doi.org/10.1038/s41598-019-52737-x, pp. 1-9, Nov. 15, 2019.

Slack, D.; Hilgard, S.; Singh, S.; and Lakkaraju, H, "How Much Should I Trust You? Modeling Uncertainty of Black Box Explanations". AIES, 2020, pp. 1-14.

Song, Y.; Shu, R.; Kushman, N.; and Ermon, S., "Constructing Unrestricted Adversarial Examples with Generative Models". In Advances in Neural Information Processing Systems 31, 2018, 8312-8323. Curran Associates, Inc. pp. 1-25.

Stallkamp, J.; Schlipsing, M.; Salmen, J.; and Igel, C., "The German Traffic Sign Recognition Benchmark: A multi-class classification competition", In IEEE International Joint Conference on Neural Networks, pp. 1453-1460, 2011.

Sudderth, E. B., "Graphical Models for Visual Object Recognition and Tracking", Submitted to the Department of Electrical Engineering and Computer Science, Massachusetts Institute of Technology, pp. 1-301, 2016.

Varma, P.; He, B.; Iter, D.; Xu, P.; Yu, R.; Sa, C. D.; and Re', C., 2016, Socratic Learning: Augmenting Generative Models to Incorporate Latent Subsets in Training Data, arXiv:1610.08123v4 [cs.LG], Sep. 28, 2017, pp. 1-17.

Varma, P.; Iter, D.; De Sa, C.; and Re', C., "Flipper: A Systematic Approach to Debugging Training Sets," In Proceedings of the 2nd Workshop on Human-In-the-Loop Data Analytics, HILDA'17. New York, NY, USA: Association for Computing Machinery. ISBN 978145035029, doi:10.1145/3077257.3077263. URL https://doi.org/10.1145/3077257.3077263, pp. 1-5, 2017.

Wu, I.; Ribeiro, M. I.; Heer, J.; and Weld, D., "Errudite: Scalable, Reproducible, and Testable Error Analysis,". In Proceedings of the 57th Annual Meeting of the Association for Computational Linguistics, pp. 747-763. Florence, Italy: Association for Computa-

(56) References Cited

OTHER PUBLICATIONS tional Linguistics, doi:10.18653/ v1/P19-1073, URL https://www.aclweb.org/anthology/P19-1073. 2019. +.

Zhang, H.; Yu, Y.; Jiao, J.; Xing, E.; Ghaoui, L. E.; and Jor-dan, M., "Theoretically Principled Trade-off between Robustness and Accuracy,". vol. 97 of Proceedings of the 36th International Conference on Machine Learning, 7472-7482. Long Beach, California, USA: PMLR. URL http:/proceedings.mlr.press/v97/ zhang19p.html, pp. 1-31, 2019.

Zhang, X.; Zhu, X.; and Wright, S. J., "Training Set Debugging Using Trusted Items," In vol. 32 No. 1 (2018): Thirty-Second AAAI Conference on Artificial Intelligence, pp. 4482-4489.

Zhao, Z.; Dua, D.; and Singh, S., "Generating Natural Adversarial Examples", In International Conference on Learning Representations (ICLR), 2018, pp. 1-16.

Christopher M. Bishop, Pattern Recognition and Machine Learning (Information Science and Statistics) Chapter 9: Mixture Models and EM, Springer-Verlag, ISBN 0387310738, 2006, pp. 423-459.

\* cited by examiner

AUTOMATIC FAILURE DIAGNOSIS AND CORRECTION IN MACHINE LEARNING MODELS

RELATED APPLICATIONS

This application claims benefit of priority to U.S. Provisional Application Ser. No. 63/086,563, entitled "AUTOMATIC FAILURE DIAGNOSIS AND CORRECTION IN MACHINE LEARNING MODELS," filed Oct. 1, 2020, and which is incorporated herein by reference in its entirety.

BACKGROUND

Machine learning models are being increasingly deployed in industries such as health care, finance, and manufacturing. However, the best performing machine learning systems are often quite complex. For instance, convolutional neural networks, one type of machine learning model, achieve state of the art results in computer vision while transformer based models, another type of machine learning model, produce state of the art results in natural language processing. These and other classes of machine learning models tend to utilize large numbers parameters (e.g., millions of parameters).

Figure 1A:
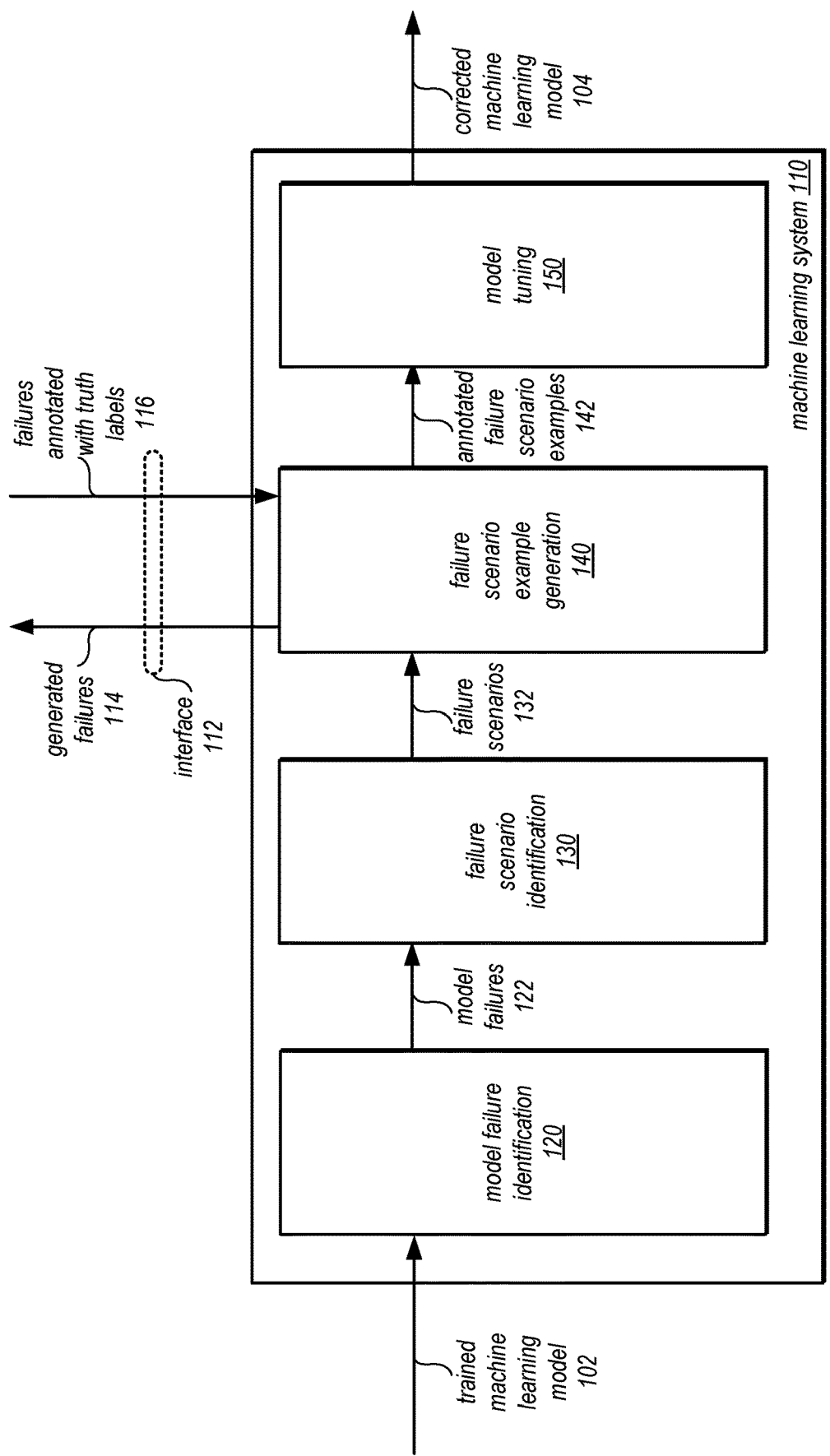
FIG. 1A illustrates a logical block diagram of automatic failure diagnosis and correction in machine learning models, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of automatic failure diagnosis for machine learning models are described herein. With greater proliferation of machine learning models, the imperative of diagnosing and correcting bugs in model behavior has become increasingly clear. Currently, many production teams perform debugging through continuous monitoring and incrementally correcting machine learning models. In various embodiments, techniques for automatic diagnosis for machine learning models may be implemented to proactively seek out and correct failure scenarios that may cause incorrect machine learning model results if they occur. To automate the process of discovering and correcting machine learning model failures, a system, such as machine learning service, application, or other system that either trains, evaluates, or deploys machine learning models may implement automation techniques, as discussed below, in various embodiments. Such techniques may be implemented to identify many potential misclassified or other erroneous inputs using a generative model, in some embodiments. Such techniques may then distill these erroneous inputs into commonly occurring failure scenarios using clustering techniques, in some embodiments. In some embodiments, the techniques may then correct machine learning model behavior on the commonly occurring failure scenarios through various optimization techniques. Techniques for automatic failure diagnosis for machine learning may be utilized for various types of data sets, in some embodiments. In this way, these failure scenarios can be successfully identified and resolved while maintaining performance that was achieved using the original test set.

Properly debugging machine learning models may be critical task when building robust and trustworthy machine learning systems. However, existing debugging systems for state of the art machine learning models suffer from serious shortcomings. Many such systems rely on aggregate test statistics (e.g., evaluating performance on a held out data set), which may overestimate real world performance. Other systems may rely on continuous monitoring. While continuous monitoring may be useful to determine whether something has already gone wrong with a model in production, correction, in such cases, has to wait until errors have already occurred and then remedied after the fact, which in some scenarios can lead to severe damage to systems, users, or other entities that rely upon the machine learning model.

In various embodiments, techniques for automatic failure diagnosis and correction for machine learning models may learn to generate failures for machine learning models. Unlike reactive debugging techniques, such techniques can proactively learn the types of data inputs that cause model failures (e.g., before the machine learning model is deployed where such failures could cause harmful results). In this way, failure scenarios that would otherwise be unknown during model design and initial training (e.g., due to a wide variety of potential input data and/or generated results) can be discovered without the damaging effects of waiting for a failure to occur for a model that is actively deployed in a system. Focusing on proactively seeking out classes of model failures before they occur in production or become revealed through aggregate test statistics may significantly improve the performance of machine learning models to better handle real world data, as weaknesses introduced by or unaddressed by training data for a machine learning model can be better accounted for. In various embodiments, techniques for automatic failure diagnosis and correction for machine learning models may generate many individual model failure instances. In various embodiments, techniques for automatic failure diagnosis and correction for machine learning models may summarize, organize, or otherwise collect the failures and presents them as different failure scenarios to an annotator for correction, which may then be used to retrain or tune the machine learning model to ameliorate or eliminate completely the failure scenario from the machine learning model.

In some embodiments, generative models may have regions in their latent space with higher concentrations of misclassifications. These regions may be used to identify or represent failure scenarios of a model (e.g., a specific type of model bug) for automatic failure diagnosis and correction, as discussed below. Therefore, techniques for automatic failure diagnosis and correction for machine learning models may utilize regions in latent space as representative of failure scenarios. For example, utilizing similar unrestricted adversarial examples concentrated in local regions in the latent space as failure scenarios (e.g., misclassification regions or other failure regions representative of model failure scenarios), in some embodiments, may allow for efficient labeling, as a single, corrected truth label may be applied to an identified region (so that each region can be labeled without having to label each instance in a region).

Consider an example implementation of a machine learning model trained to classify traffic signs in autonomous driving. Although the machine learning model may score with very high test accuracy, techniques for automatic failure diagnosis and correction for machine learning models may be applied to discover that the model incorrectly classifies 50 km/h signs under certain lighting conditions. Once this failure is identified, techniques for automatic failure diagnosis and correction for machine learning models may generate many examples of incorrectly classified 50 km/h signs. These examples may then be used to correct classifier behavior. Discovering this error with a reactive debugging technique such as model monitoring could potentially lead to disastrous results if the model was deployed in a vehicle (as a system dependent on the classification in the vehicle, such as automatic navigation or various safety features may fail to act correctly). Instead, techniques for automatic failure diagnosis and correction for machine learning models can identify errors before they occur and correct them.

FIG. 1A illustrates a logical block diagram of automatic failure diagnosis and correction in machine learning models, according to some embodiments. Machine learning system 110 may be a stand-alone machine learning development, training, and/or debugging system, in various embodiments, that may implement automatic failure diagnosis and correction, as discussed above and in detail below with regard to FIGS. 2-7. In some embodiments, machine learning system 100 may be implemented as part of a machine learning service, such as machine learning service 210 discussed below with regard to FIG. 2. Machine learning system 110 may be implemented on one or multiple computer systems, like computer system 1000 discussed below with regard to FIG. 8.

In various embodiments, machine learning system 110 may implement model failure identification 120. Model failure identification may take a trained machine learning 102 in order to identify data inputs to the model that cause failing results, in some embodiments. For example, a programmatic interface, graphical user interface, and/or command line interface (e.g., the same as or different than interface 112) may be implemented to upload, identify a location of, and/or otherwise obtain a trained machine learning model. As discussed below with regard to FIG. 3, model failure identification 120, as well as failure scenario identification 130, failure scenario example generation 140, and model tuning 150 may be implemented as part of a training pipeline, workflow or other process for the machine learning model, and thus trained machine learning model 102 may be provided by another component of machine learning system 110.

In order to identify failure data inputs, in some embodiments, a training technique and set of model architectures which rely on a variational auto encoder (VAE) may be implemented as part of model failure identification 120, and as discussed in detail below (e.g., with regard to Algorithm 1) and FIG. 6. In various embodiments, a VAE may include an encoder and a decoder (e.g., implemented as neural networks) that are used to model the relationship between data x and latent factors $z \in \mathbb{R}^K$. Model failure and identification 120 may identify many possible classifier failure situations by making small, semantically meaningful changes to input data using a VAE trained on the data distribution, in some embodiments. Model failure identification 120 may perform this step through a first encoding of an instance in the encoder of the VAE. Then, model failure identification 120 may add a small amount of noise drawn from a beta distribution to a latent encoding vector. If the trained machine learning model 102 prediction deviates from the ground truth label on the altered instance, model failure identification 120 returns the data instance as a potential data input failure.

Many model failures with corresponding input data may be identified, in various embodiments. These model failures 122 may be provided to failure scenario identification 130. In various embodiments, failure scenario identification 130 may aggregate the failure instances generated by performing failure identification on each data instance in the training data. In various embodiments, one or more clustering techniques may be implemented to perform the aggregation. For example, failure scenario identification 130 may distill the instances of failure through clustering on the failure instances' latent codes using a nonparametric Gaussian mixture model, in some embodiments. This nonparametric Gaussian mixture model may produce a set of clusters centers defined by a mean and covariance matrix, in some embodiments. The cluster centers may be considered or used to identify failure scenarios to indicate that each of them is a high level summary of specific model failures, in some embodiments.

Once failure scenarios are identified, they may be provided 132 to failure scenario example generation 140. Failure scenario example generation 140 may use the provided failure scenarios 132 to support correction of the model failure scenarios at model tuning 150, (e.g., as discussed below with regard to FIG. 7). For example, in various embodiments, failure scenario example generation 140 may implement an interface 112 to provide a visualization tool and labeling system to present the failure scenarios to an annotator. For example, generated failures 114 may be provided via interface 112 to allow the annotator to provide truth labels 116 to annotate the examples of the failure scenarios. Failure scenario example generation 140 may create or otherwise draws samples from each of the identified failure scenarios 132, decode the samples into images using the decoder of the VAE, and aggregate the images for presentation to the annotator via interface 112 (e.g., as grouping of sample failure images, in some embodiments. In some embodiments, the annotator may select failure scenarios deemed most problematic via interface 112. In some embodiments, the annotator may assign a single correct label to the failure scenario, as indicated at 116. Annotated failure scenarios 142 may be provided to model tuning 150, which may perform fine tuning using the annotated failure scenario examples 142 to correct model performance, in some embodiments. In some embodiments, model tuning 150 may tune with the loss term used to train the original model 102 and an additional regularization term. This regularization term may be the cross entropy loss between samples from the failure mode and annotator label, in some embodiments. This regularization term may encourage the model to perform correctly on the failure scenarios while preventing degradation in model performance, in some embodiments.

The process of discovering when machine learning models fail and correcting performance in these scenarios may be implemented as part of the development life cycle. Uncovering bugs helps developers make important decisions about both development and deployment of machine learning models. In practice, much of debugging uses aggregate test statistics (like those in leader board style challenges and continuous evaluation in deployment. However, additional issues arise with overreliance on test statistics. For instance, aggregate statistics like held out test accuracy are known to overestimate generalization performance. Further, statistics offer little insight nor remedy for specific model failures. Last, reactive debugging as failures occur in production does little to mitigate harmful user experiences.

While some techniques exist for identifying failures in machine learning models, these include explanations, fairness metrics, data set replication, and behavioral testing tools that do not preemptively identify specific model failures or require a high level of human supervision. Techniques for automatic failure diagnosis and correction for machine learning models may be used, instead, to automatically identify plausible model failures by generating and aggregating natural adversarial examples. In this way, techniques for automatic failure diagnosis and correction for machine learning models may reduce to a minimum human supervision while revealing insightful model failures.

Figure 1B:
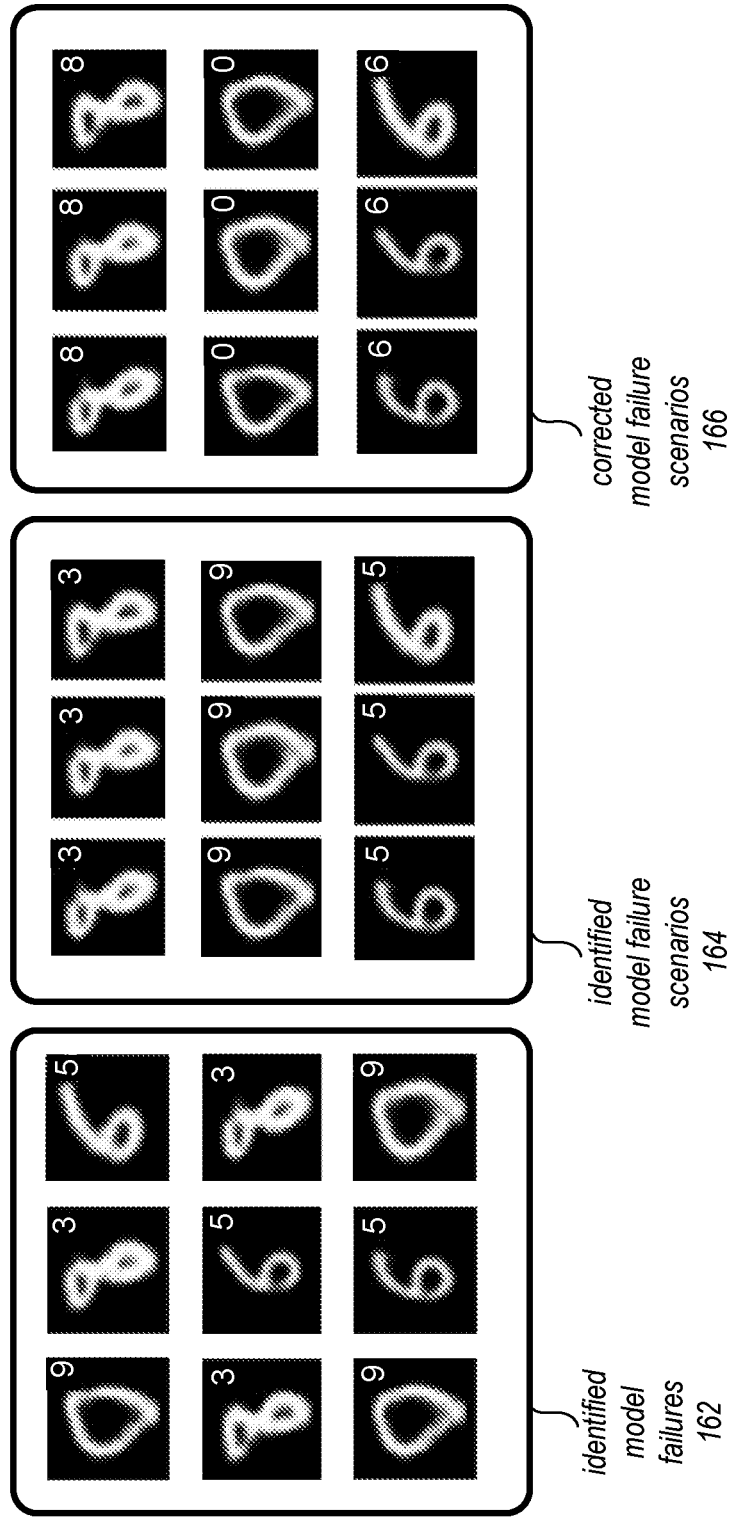
FIG. 1B illustrates example input data and model generated labels for automatic failure diagnosis and correction in machine learning models, according to some embodiments.

FIG. 1B illustrates example input data and model generated labels for automatic failure diagnosis and correction in machine learning models, according to some embodiments. As an example, a classifier machine learning model trained on Modified National Institute of Standards and Technology database (MNIST) which may provide a large database of handwritten digits, as illustrated in FIG. 1B. The trained MNIST classifier may exhibit good classification performance scoring 99.1% test accuracy. In the identification step, as indicated at 162, techniques for automatic failure diagnosis and correction for machine learning models may generate failure inputs for the model. For example, the images illustrated at 162 may be generated by the VAE. The number in the upper right hand corner of the images may be MNIST classifier prediction.

Although the MNIST classifier achieves high test set performance, there may be naturally occurring examples which are classified incorrectly. Next, techniques for automatic failure diagnosis and correction for machine learning models may identify failure scenarios from the identified failures, as indicated at 164. As discussed above, in some embodiments, a clustering model may groups together similar failures for subsequent annotator labeling. It may be that similar failures are grouped together, in some embodiments. For instance, as illustrated in FIG. 1B at 164 a similar style of incorrectly classified eights in the first row may be grouped together. Next, annotator labels may be received for each of the clusters. Correction may then be performed using both the annotator labeled data as well as the original training data, in some embodiments. The corrected model may then correctly classifies the images, as indicated at 166. In various embodiments, the corrected model may maintain its predictive performance, scoring 99.1% accuracy after tuning. This example indicates that techniques for automatic failure diagnosis and correction for machine learning models may serve as a comprehensive system to both discover and correct naturally occurring model failures, which might be otherwise undiscovered until after machine learning model deployment.

In various embodiments, β-VAE may be implemented for generating failure examples. Example notation and background on β-VAE may be described for techniques for automatic failure diagnosis and correction for machine learning models, as discussed below. In some embodiments, a structural similarity index (SSIM) as the reconstruction loss β-VAE may be used.

In some embodiments, techniques for automatic failure diagnosis and correction for machine learning models may be described as follows. Let f: $\mathbb{R}^N \to [0,1]$ denote a classifier that accepts a data point x consisting of N features and returns the probability that x belongs to a class $c \in C$. Further, assume f is trained (e.g., through gradient descent) on some data set $\mathcal{D}$ consisting of d tuples (x, y) containing data point x and ground truth label y using loss function $\mathcal{L}$. In some embodiments, an oracle feature, oracle o: $x \in X | o(x) \neq f(x)\}$ that outputs a label for x may be implemented.

A goal may be to identify clusters in generative factors of the data which the model misclassifies such that an annotator can easily provide the correct label to the cluster. As such, let x be generated by some ground truth independent latent factors $v \in \mathbb{R}^K$ and conditionally dependent factors $w \in \mathbb{R}^H$: p(x|v, w). A deep generative model of X may be trained in an unsupervised manner. The joint distribution of a set of generative factors $z \in \mathbb{R}^M$ and the data x such that the learned generative factors closely resemble the true factors: p(x|v, w)≈p(x|z) may be learned.

In various embodiments, β-VAE may be implemented to train such an unsupervised generative model of the data. β-VAE may encourage learning disentangled latent representations, in some embodiments. In some embodiments, isotropic unit Gaussian prior may be imposed over the latent factors (p(z)=$\mathcal{N}(0,1)$) and establish a parametric likelihood $p_\theta(x|z)$. The model may be trained by minimizing the divergence between the data distribution and the model parameters with respect to θ. It may be that $\arg\min_\theta KL(p(x)\|p_\theta(x))=\arg\max_\theta \mathbb{E}_p(x)[\log p_\theta(x)]$ where $p_\theta(x)=\int p_\theta(x|z)p(z)dz$ are optimized. However, calculating $p_\theta(x)$ may be intractable, so the parametric model $q_\phi(z|x)$ may be introduced and construct the variational lower bound (ELBO) with respect to $\log p_\theta(x)$, which can be shown to be:

$$L(\Theta,\phi;x,z)=\mathbb{E}_{q_\phi(z|x)}[\log p_\theta(x|z)]-\beta KL(q_\phi(z|x)\|p(z))$$

In various embodiments, the approximate posterior $q_\phi(z|x)$ may take on Gaussian form with diagonal covariance. Additionally, β may control the strength of the constraint on the prior. Increased β may generally encourage high degrees of disentanglement in the latent representation. Further, $q_\phi(z|x)$ may be considered the encoder in a stochastic autoencoder while $p_\theta(x|z)$ may be the decoder. The parameters of the neural networks defining both the encoder and decoder may be φ and θ respectively. The parameters ø and 0 may be optimized in joint using stochastic gradient ascent, in some embodiments.

In various embodiments, to improve the sample quality produced by VAE's, a Structural Similarity Index (SSIM) may be used. The reconstruction loss (e.g., first term) in the above equation may be replaced with the SSIM loss. The SSIM may define a similarity metric between a set of images. The loss function may use a Gaussian filter over a set of pixels. For example, the SSIM for pixel p may be defined as:

$$\frac{2\mu_x\mu_y+C_1}{\mu_x^2\mu_y^2+C_1}\cdot\frac{2\sigma_{xy}+C_2}{\sigma_x^2+\sigma_y^2+C_2}$$

Here, $\mu_x$ and $\mu_y$ may denote the mean pixel intensity and ox and Oy may denote the standard deviations. $C_1$, $C_2$, $C_3$ may be constant values used for numerical stability, in some embodiments. In some embodiments, SSIM may take into account the structure, luminance (expressed through the local means) and contrast (expressed through the standard deviations) of a set of pixels.

In various embodiments, identification techniques, such as those implemented by model failure identification 120 discussed above may be described and/or implemented in the following example ways. The aim of identification may be, in some embodiments, to generate many plausible data instances x that are misclassified by the model f.

In various embodiments, it may be assumed that VAE is trained on the instances $x\in\mathcal{D}$. To perform identification for data input x with ground truth label y, the latent representation of the input using $q_\phi(z|x)$ may be generated, and the encoded mean and variance may be produced, $\mu_i$ and $\sigma_i$ respectively for each $i\in M$ latent factors (recalling that $q_\phi(z|x)$ is constructed as Gaussian). Next, the techniques may draw from Beta(a, b) centered at each $\mu_i$, producing latent vector z. In some embodiments, it may be that a=b=0.3 is fixed to encourage sampling z's that deviate from the mean. Because the support of the Beta distribution is on the range [0, 1], each z sample may be on the range [$\mu_i$−0.3, $\mu_i$+0.3], in some embodiments. Because the unit Gaussian prior generally encourages the variance to be close to 1, this may be a reasonable choice. Next, the sampling procedure may be repeated Q times to produce latent vectors $\in \mathbb{R}^{Q\times M}$. A reconstructed matrix of samples $\hat{X}\in\mathbb{R}^{Q\times N}$ may be generated using decoder $p_\theta(x|z)$ for $\mathcal{Z}$. Finally, $\hat{x}_i\in\hat{X}$ and corresponding latent codes $z_i\in\mathcal{Z}$ may be returned where arg $\max_c f(\hat{x}_i)\neq y$. In some embodiments, the returned failure scenarios may be defined as latent codes:

$$\psi:=\{z_i|\arg\max_c f(\hat{x}_i)\neq y\}$$

| Algorithm 1 Procedure for identifying failure scenarios |
|---|
| 1:  procedure IDENTIFY(f, p, q, x, y, a, b) |
| 2:  ψ := { } |
| 3:  μ, σ := qφ (z\|x) |
| 4:  for i ∈ {1, ..., Q} do |
| 5:  E := [Beta(a, b)1 , ..., Beta(a, b)M ] |
| 6:  xdecoded := pθ (μ + E) |
| 7:  if y /= f(xdecoded ) then |
| 8:  ψ = ψ ∪ xdecoded |
| 9:  end if |
| 10:  end for |
| 11:  Return ψ |
| 12:  end procedure |

Algorithm 1, illustrated above, provides an example model failure identification technique that may be implemented in some embodiments, which may generate many unrestricted adversarial examples for a model being diagnosed. For example, the training data for a model may be encoded (e.g., images for training an image classification model as discussed with the example above for FIG. 1B). The encoded training data, the latent codes, may then be perturbed using an amount of noise (e.g., a small amount of noise) drawn from a Beta distribution. A Beta distribution may be used so that it is possible to control the shape of the applied noise, in some embodiments. Instances that when decoded have different inferences (e.g., classifications) from ground truth may be saved. By perturbing the latent codes with a small amount of noise, the decoded instances may have small but semantically meaningful differences from the original instances. Thus if the model prediction deviates from the perturbation, then the instance is likely incorrect, a failure. The process of identifying plausible failure instances over the entire data set may be repeated.

In Algorithm 1, the identification step over each instance $x\in X$ producing a set Ψ (the set of failure instances for a model) containing the ψ (the set of unrestricted adversarial examples produced for an instance x which may be performed for each x. Where Identify (·) corresponds to the identification step, may define Ψ as:

$$\Psi:=\cup\{\forall(x,y)\in\mathcal{D},\text{Identify}(f,p,q,x,y,a,b)\}$$

Failure scenario identification 130 may be implemented using the various techniques described below, in some embodiments. In some embodiments, failure identification (e.g., distillation) may cluster the identified latent codes. By clustering the latent codes, regions in the latent space with consistently buggy model behavior may be discovered (as noted above). For example, as discussed above, failure scenarios may be represented as regions in latent space. Such regions may be described in various ways. For example, a region may be described as, given a constant $\epsilon>0$, vector norm $\|\cdot\|$, model f, and point z', a region indicating a failure scenario may be a set of input data (e.g., images) $A_R=\{x\varepsilon X|\epsilon>\|q_{q_\phi}(x)-z'\|\wedge o(x)\neq f(x)\}$. In another example, a relaxed description (e.g., a relaxation of an assumption that the oracle and the model disagree on every instance in a region) may be described as constant $\epsilon>0$, vector norm $\|\cdot\|$, model f, threshold ρ, and point z', a region indicating a failure scenario may be a set of input data (e.g., images) $A_f=\{x\varepsilon X|\epsilon>\|q_{q_\phi}(x)-z'\|\}$ such that $|\{x\in A_f|o(x)\neq f(x)\}|/|A_f|>\rho$.

In some embodiments, a Gaussian mixture model with Dirichlet process prior may be used to cluster (although other clustering techniques may be used in other embodiments). As the correct number of failure scenarios may be unknown, the correct number of failure scenarios can be inferred from the data by using a non-parametric model, in some embodiments. The mixture model may be described as:

$$p(z|\theta_1, \ldots, \theta_K) = \sum_{j=1}^{K} \pi_j N\left(z|\mu_j, \sum_j\right)$$

where $\theta_j=(\mu_j, \sigma_j, \pi_j)$ are parameters for component j. This includes the mixing proportions $\pi$ that sum to 1, the mean vector $\mu_j$ and precision matrix $\Sigma_j$. To make inference on the model more efficient, the truncated stick breaking construction of the Dirchlet process may be used, where K is the upper bound of the number of mixtures. Writing $G_0$ as the joint prior on the component parameters, defining indicator variable $c_i$, i=1, . . . , n, and letting stickbreak denote the truncated stick breaking distribution, the generative process for generating failures may be described as:

$z_i|c_i,\Theta \sim \mathcal{N}(\mu_{c_i}, S_{c_i})$ $(\mu_j, S_j) \sim G_0$ $c_i|\pi \sim \text{Categorical}(\pi)$ $\pi = \text{stickbreak}(v)$ $v_K|\alpha \sim \text{Beta}(1, \alpha)$ To perform inference on the model, expectation maximization (EM) may be employed, in some embodiments. Once EM is run and the parameter values are determined, the cluster components may be discarded which are not used by the model, in some embodiments. In some embodiments, some small $\epsilon$ and filter clusters may be fixed whose mixing parameters are smaller than this value. The set of failure scenarios A generated at the distillation step may be described as:

$\Lambda:=\{(\mu_j,\Sigma_j,\pi_j)|\pi_j > \epsilon\}$

In various embodiments, failure scenario example generation 140 may implement the below techniques. For each failure scenario identified in $\Lambda$, a sample of Q latent codes from $z \sim \mathcal{N}(\mu_j, \sigma_j)$ may be taken and used to perform reconstruction using the decoder $p_\theta(x|z)$ from the VAE to produce a set of faulty data instances (e.g., generated failures 114). In some embodiments, a hyper parameter $\tau$, where $\Sigma \epsilon$ $\mathbb{R}$, may be used to control sample diversity from the failure scenarios.

Next, an annotator reviews the reconstructed instances from the scenario and decides whether the scenario constitutes a model failure. If so, the annotator assigns the correct label to all of the instances, as indicated at 116. The correct label constitutes a single label for all of the instances generated from the scenario. As noted above, this label could be applied to a region in latent space, in some embodiments, in order to allow the label to be applicable to any instance within the region. This process may be repeated for each of the scenarios identified in $\Lambda$. Pseudo code for the technique is given in Algorithm 2, which may be implemented in some embodiments. In the algorithm, Annotator—Correction(·) and Annotator—Label(·) may be the steps where the annotator decides whether the scenario warrants correction and uniform annotator label for each of the instances in the failure scenario.

| Algorithm 2 The procedure for labeling failure scenarios. |
|---|
| 1:     procedure LABEL FAILURE SCENARIOS(Q, $\Lambda$, p, q) |
| 2:         Df := { } |
| 3:         for ($\mu$, $\sigma$, $\pi$) $\in$ $\Lambda$ do |
| 4:             Xdecoded := { } |
| 5:             for i $\in$ {1, .., Q} do |
| 6:                 Xdecoded := Xdecoded $\cup$ q$\theta$ (N ($\mu$, $\sigma$)) |
| 7:             end for |
| 8:             if Annotator-Correction(Xdecoded ) then |
| 9:                 Df := Df $\cup$ {Xdecoded , Annotator-Label(Xdecoded )} |
| 10:           end if |
| 11:        end for |
| 12:        Return $\cup$ Df |
| 13:    end procedure |

As noted earlier, hyperparameter t may be used to control the diversity of samples taken from a failure scenario (e.g., from a region in latent space). To account for this, a variation of Algorithm 2 that incorporates this may be described as:

| Algorithm 3 The procedure for labeling failure scenarios with diversity control |
|---|
| 1:     procedure LABEL FAILURE SCENARIOS(Q, $\Lambda$, p, q, $\tau$) |
| 2:         Df := { } |
| 3:         for ($\mu$, $\sigma$, $\pi$) $\in$ $\Lambda$ do |
| 4:             Xdecoded := { } |
| 5:             for i $\in$ {1, .., Q} do |
| 6:                 Xdecoded := Xdecoded $\cup$ q$\theta$ (N ($\mu$, $\tau \cdot \sigma$)) |
| 7:             end for |
| 8:             if Annotator-Correction(Xdecoded ) then |
| 9:                 Df := Df $\cup$ {Xdecoded , Annotator-Label(Xdecoded )} |
| 10:           end if |
| 11:        end for |
| 12:        Return $\cup$ Df |
| 13:    end procedure |

In various embodiments, model tuning 150 may implement the below techniques. To correct the model's behavior on the identified failure scenarios, fine-tuning may be performed on the training data with an additional regularization term, in some embodiments. The regularization term may be the cross entropy loss between the identified failure scenarios and the annotator label. Where CE is the cross entropy loss applied to the data returned from algorithm 2 and $\lambda$ is the hyperparameter for the regularization term, the following objective may, in some embodiments, be optimized using gradient descent:

$$\mathcal{F}(\mathcal{D}, \mathcal{D}_f) = \mathcal{D}(\mathcal{L}) + \lambda \cdot CE(\mathcal{D}_f)$$

In view of the discussion above, the robustness of a machine learning model may be largely determined as a result of the data it is trained on. The machine learning model extracts features from training data to properly predict unknown real world cases. The underlying assumption is that the inference data follows a similar distribution as the training data, which is not necessarily always the case. Understanding possible failure scenarios before the model is deployed to production is crucial in a range of applications. As noted earlier, most commonly used metrics such as held out test accuracy and AUC are not enough to assess the performance of ML models, as these metrics do not offer insight into mis-classified data or the capacity to correct undesirable model behavior. Techniques for automatic diagnosing and correction of machine learning models, as discussed above, and below may addresses those challenges by generating new data samples that enforce model failures. In contrast to adversarial examples, this may be implemented, in some embodiments, by training a generative model on the training data and sampling from the latent space therefore creating realistically looking images without random perturbations in the input data. Techniques for automatic diagnosing and correction of machine learning models may then distills these failures into commonly occurring patterns through a clustering based approach and resolves model behavior on the distilled scenarios through constrained optimization.

Please note that the previous description of automatic diagnosing and correction of machine learning models discussed in FIGS. 1A and 1B is a logical illustration of techniques for automatic diagnosing and correction of machine learning models and thus is not to be construed as limiting. Various other arrangements, architectures, and/or system components may be implemented to implement the techniques discussed above.

This specification continues with a general description of a provider network that implements multiple different services, including a machine learning service, which may implement techniques for automatic diagnosing and correction of machine learning models. Then various examples of, including different components/modules, or arrangements of components/module that may be employed as part of implementing the machine learning service are discussed. A number of different methods and techniques to implement techniques for automatic diagnosing and correction of machine learning models are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
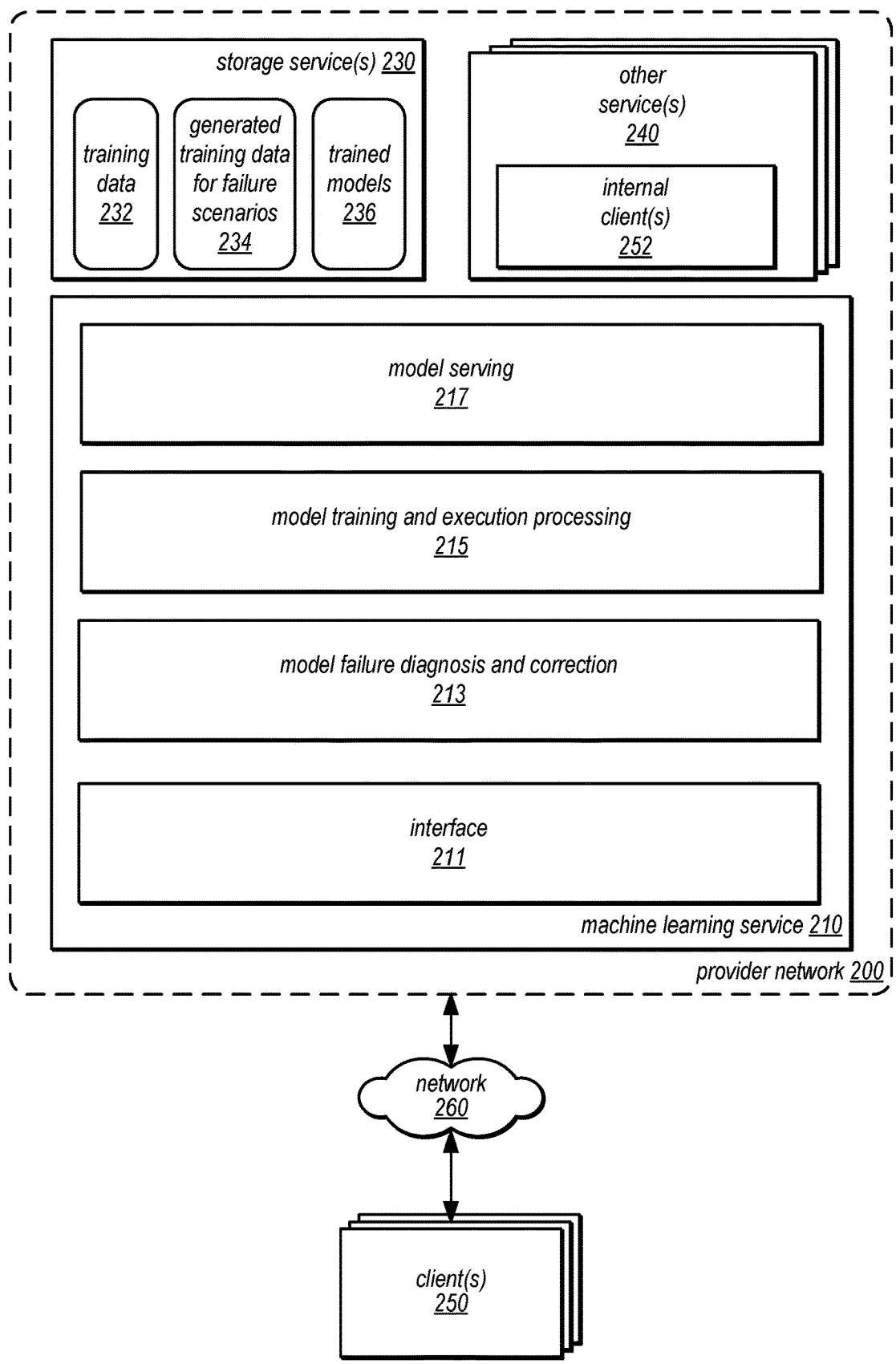
FIG. 2 illustrates an example provider network that may implement a machine learning service that implements automatic failure diagnosis and correction in machine learning models hosted in the machine learning service, according to some embodiments.

FIG. 2 illustrates an example provider network that may implement a machine learning service that implements automatic failure diagnosis and correction in machine learning models hosted in the machine learning service, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200, in one embodiment. In some embodiments, provider network 200 may implement various computing resources or services, such as machine learning service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below, in one embodiment. In various embodiments, the functionality of a given system or service component (e.g., a component of machine learning service 210 may be implemented by a particular node or may be distributed across several nodes. In some embodiments, a given node may implement the functionality of more than one service system component (e.g., more than one data store component).

Machine learning 210 may implement interface 211 to allow clients (e.g., client(s) 250 or clients implemented internally within provider network 200, such as a client application hosted on another provider network service like internal client(s) 252, to search for trained machine learning models, train and build machine learning models, test and tune machine learning models, and deploy and or otherwise manage machine learning models using a fully managed service. For example, machine learning service 210 may implement interface 211 (e.g., a graphical user interface, programmatic interface that implements Application Program Interfaces (APIs) and/or a command line interface), which may be implemented so that a client can request to build and train machine learning models, as well as perform techniques for automatic failure diagnosis and correction in machine learning models hosted in the machine learning service, as discussed above with regard to FIGS. 1A-1B and below with regard to FIGS. 3-7. For example, interface 211 may implement an integrated development environment (IDE), which allows for users to enter text to write code or configure parameters for various machine learning model development tasks, select from templates or pre-designed machine learning models or pipelines, edit or create-from-nothing machine learning models and/or pipelines, execute various testing, training, and/or tuning tasks, among other features. Example interface 410, for instance, may be implemented as part of interface 211, which may provide for the display of various failure scenarios as part of a testing or debugging phase for a machine learning model developed at machine learning service 210 via interface 211.

Machine learning service 210 may implement a control plane to perform various control operations to implement the features of machine learning service 210. For example, a control plane may monitor the health and performance of requests at different components, such as model failure diagnosis and correction 213, model training and execution processing 215, and model serving 217, providing scalable performance by distributing workloads, tasks, jobs, and/or other features of machine learning service 210 to the appropriate resources (e.g., processing nodes or clusters of processing nodes allocated to perform a training task, a tuning task, a failure scenario identification task, etc.) as well as automatically increasing or decreasing the number of resources allocated in order meet a performance threshold for machine learning service 210. If a node or other service component fails, a request, task or other job fails, or other interruption occurs, the control plane may be able to restart a task or job to complete a request (e.g., instead of sending a failure response to the client). The control plane may, in some embodiments, may arbitrate, balance, select, or dispatch requests to different node(s), in various embodiments.

Machine learning service 210 may implement model failure diagnosis and correction 213 to implement the features discussed above with regard to FIG. 1A-1B and below with regard to FIGS. 3-7 to perform automatic failure diagnosis and correction for machine learning models. For example, model failure diagnosis and correction 213 may implement workflows, interfaces, and other tasks to utilize model training and execution processing 215 to perform various aspects of failure identification, failure scenario classification, example failure generation, and model tuning for correction, as discussed in detail below with regard to FIG. 3.

Model training and execution processing 215 may implement various machine learning frameworks and to support and execute various training and tuning algorithms, model types, or other tasks to prepare machine learning model for deployment. For example model training and execution processing 215 may implement various individual nodes or clusters of nodes that perform various training jobs requested via interface 211. In some embodiments, model failure and diagnosis and correction 213 may interact with (or be implemented part of) model training and execution processing 215, invoking tasks to perform model failure identification, failure scenario identification, failure example generation, and/or model tuning, as discussed above.

Machine learning serving 217 may be implemented to deploy models that have been trained and corrected using model failure diagnosis and correction feature 213, in some embodiments. For example model serving 217 may host machine learning models that can be invoked (e.g., by a request to perform an inference or other task using a deployed machine learning model) by a request to an network endpoint associated with the deployed machine learning model (e.g., hosted on one or more nodes that can apply the model to given input data) and return a result for the request. Machine learning service 217 may implement a serverless management model so that the number of nodes or other resources used to deploy machine learning models is automatically managed in order to satisfy demand or other performance criteria without a user having to manually configure and/or adjust the number of resources.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may include various kinds of relational or non-relational databases, in some embodiments. Data storage service(s) 230 may include object or file data stores for putting, updating, and getting data objects or files, in some embodiments (e.g., training data 232, generated training data for failure scenarios 234, trained models 236, and/or any other artifacts generated by or for machine learning service 210). For example, data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs) or graphical user interfaces. As illustrated in FIG. 2, training data 232, which may be training data for models being diagnosed and corrected (including the additional input data with obtained corrected labels) may be stored in storage services 230, in some embodiments. In some embodiments, generated training data for failure scenarios, as discussed above, may be stored as indicated at 234.

Generally speaking, clients 250 may encompass any type of client that can submit network-based requests to provider network 200 via network 260, including requests for machine learning service 210 (e.g., a request to build and/or train a machine learning model, a request to diagnose and correct a machine learning mode using, for example, an interface like that discussed below with regard to FIG. 3, etc.). For example, a given client 250 may include a suitable version of a web browser, or may include a plug-in module or other type of code module that can execute as an extension to or within an execution environment provided by a web browser. Alternatively, a client 250 may encompass an application (or user interface thereof) that may make use of machine learning service 210 to implement various features. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document or message-based network-based services architecture, or another suitable network-based services architecture.

In some embodiments, a client 250 may provide access to provider network 200 to other applications in a manner that is transparent to those applications. Clients 250 may convey network-based services requests (e.g., access requests to read or write data may be via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
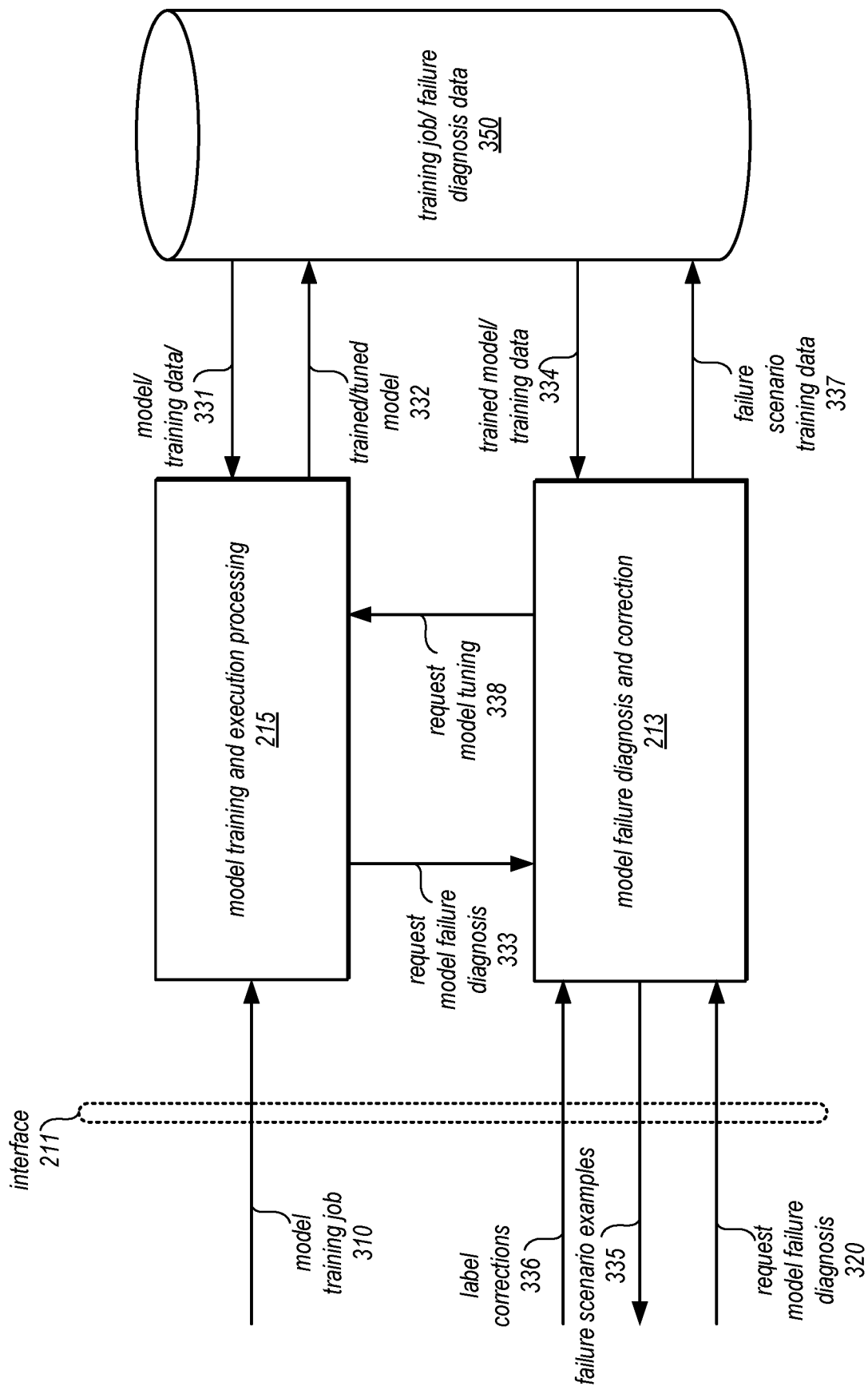
FIG. 3 illustrates interactions between a machine learning service and a client to train, diagnose, and correct a machine learning model, in some embodiments.

FIG. 3 illustrates interactions between a machine learning service and a client to train, diagnose, and correct a machine learning model, in some embodiments. Automatic failure diagnosis and correction may be implemented as part of a stand-alone feature implemented by machine learning service 210 and/or incorporated as part of a machine learning training workflow, process, and/or pipeline.

For example, as illustrated in FIG. 3, a model training job 310 may be received via interface 211. Model training job 310 may specify various features for training one (or more) machine learning models, such as the training algorithm to use, hyperparameters for training the machine learning model, the identity and/or location of a training data set, a result or destination location for a trained model and/or other artifacts, various training computing resource performance configuration information (e.g., number of nodes, servers, instances, containers, etc. which may be used to execute the training job, performance limitations, resource usage limitations, and/or training time limitations, including a stop limitation, and, in some embodiments a request to perform automatic failure scenario diagnosis and tuning. Model training and execution processing 215 may assemble, provision, configure, initiate, and perform the various tasks to execute model training job 310. For example model training and execution processing 215 may obtain the machine learning model, training data, and/or other information used to execute model training job 310 from a data store (or multiple data stores), like training job/failure diagnosis data 350.

As part of executing the model training job 310, model training and execution processing 215 may invoke or otherwise request model failure diagnosis 333 from model failure diagnosis and correction 213. As discussed above, model failure diagnosis and correction 213 may implement various techniques to identify model failures, determine failure scenarios, generate examples for the failure scenarios and obtain information to correctly label the example failure scenarios. Model failure diagnosis and correction 213 may obtain the trained model and/or training data 334. Model failure diagnosis and correction 213 may provide the failure scenario examples 335 via interface 211, as discussed below with regard to FIG. 4. In some embodiments, these failure scenarios may be distributed via another service or feature of machine learning service 210, which may distribute the failure scenarios to multiple annotators for review and correction. Label corrections for the failure scenario examples may be received, as indicated at 336, via interface 211. The failure scenario training data 337, based on label corrections 336 for failure scenario examples 335 may then be stored. A request to perform model tuning, as indicated at 338, may be sent to model training and execution processing 215 in order for various retraining and/or other tuning techniques may be implemented and a tuned model stored, as indicated at 332.

In some embodiments, automatic failure diagnosis and correction 213 may be invoked separate from a model training job. For example, as indicated at 320, a request for model failure diagnosis 320 may be received via interface 211. The request 320 may include various features such as an identifier for a trained machine learning model, an identifier or location of training data used to train the trained machine learning model, a number or other configuration of performing model failure diagnosis and correction (e.g., a minimum number of model failure scenarios to identify, a number of failure scenario examples to return for annotation, a number of nodes, servers, instances, containers, etc. which may be used to execute the automatic failure diagnosis, performance limitations, resource usage limitations, and/or training time limitations on automatic model failure diagnosis and correction, tuning configuration for generated failure scenario training data, among other features.

As discussed above, model failure diagnosis and correction 213 may implement various techniques to identify model failures, determine failure scenarios, generate examples for the failure scenarios and obtain information to correctly label the example failure scenarios. Model failure diagnosis and correction 213 may obtain the trained model and/or training data 334. Model failure diagnosis and correction 213 may provide the failure scenario examples 335 via interface 211, as discussed below with regard to FIG. 4. Label corrections for the failure scenario examples may be received, as indicated at 336, via interface 211. The failure scenario training data 337, based on label corrections 336 for failure scenario examples 335 may then be stored. A request to perform model tuning, as indicated at 338, may be sent to model training and execution processing 215 in order for various retraining and/or other tuning techniques may be implemented and a tuned model stored, as indicated at 332.

Figure 4:
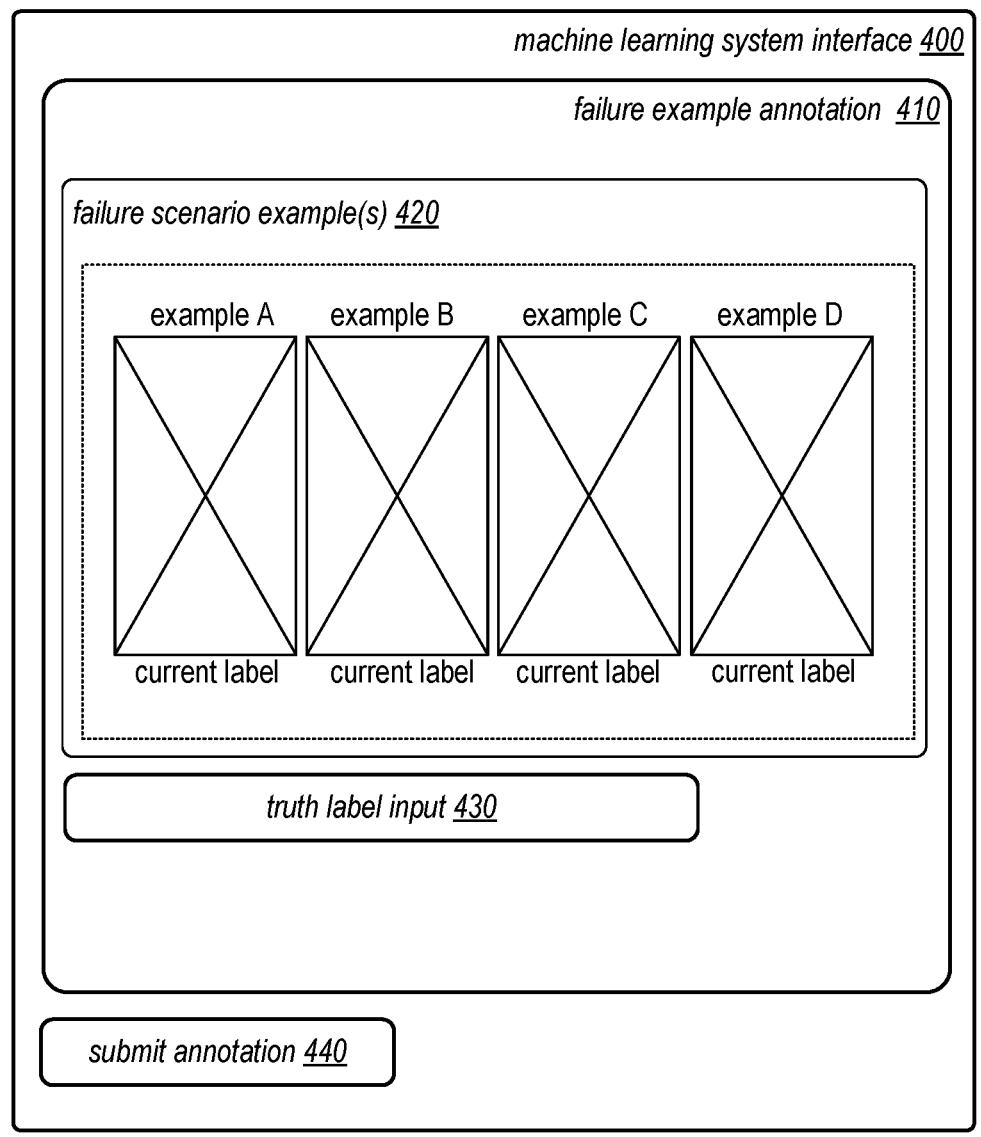
FIG. 4 illustrates an example debug interface for automatic failure diagnosis and correction, according to some embodiments.

FIG. 4 illustrates an example debug interface for automatic failure diagnosis and correction, according to some embodiments. Machine learning system interface 400 may be implemented as part of interface 211 discussed above, in some embodiments. Machine learning system interface 400 may implement a graphical user interface element for failure example annotation 410, in some embodiments. Failure example annotation 410 may display one (or multiple) failure scenario examples 420 (e.g., examples A, B, C, and D), generated according to the techniques discussed above. In at least some embodiments, as illustrated in the example in FIG. 1B, a current label (which may be an erroneous label produced by the trained machine learning model being diagnosed) may be provided for each provided example A, B, C, and D of the failure scenario. Failure example annotation 410 may implement a truth label input element 430. In this way, a user can submit, via element 440, the annotation for the failure scenario input via truth label input 430 for failure scenario examples in order to provide truth labels to tune the model according to the techniques discussed above. In some embodiments, the current labels may not be erroneous. In such cases, a user may input the current label as the truth label, in some embodiments.

Although FIGS. 2-4 have been described and illustrated in the context of a provider network implementing a machine learning service, the various components illustrated and described in FIGS. 2-4 may be easily applied to other model training, debugging, tuning, and/or deployment systems. As such, FIGS. 2-4 are not intended to be limiting as to other embodiments of automatic failure diagnosis and correction in machine learning models.

Figure 5:
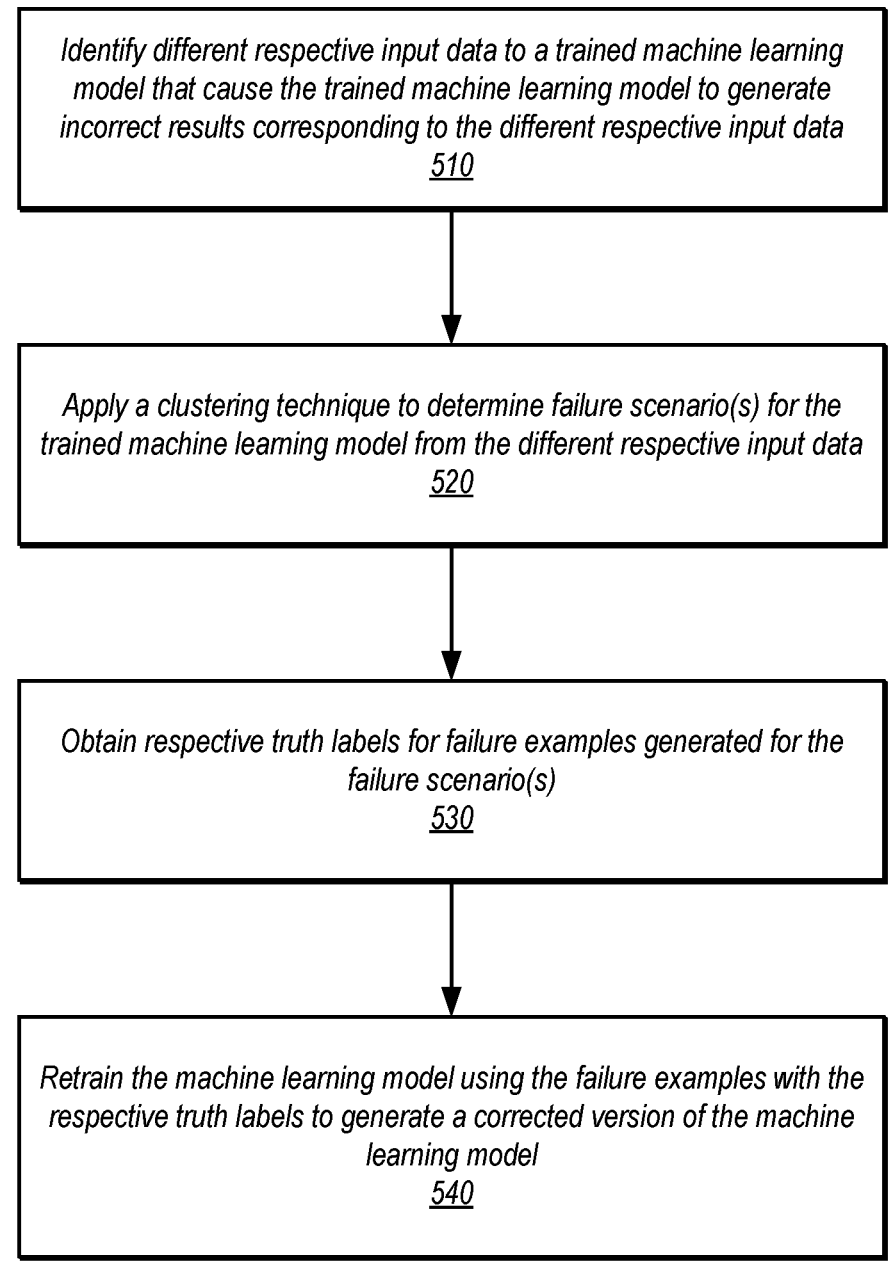
FIG. 5 illustrates a high-level flowchart of various methods and techniques to implement automatic failure diagnosis and correction in machine learning models hosted in the machine learning service, according to some embodiments.

FIG. 5 illustrates a high-level flowchart of various methods and techniques to implement automatic failure diagnosis and correction in machine learning models hosted in the machine learning service, according to some embodiments. Various requests, such as requests to train a machine learning model and/or diagnose and tune a trained machine learning model, as discussed above with regard to FIG. 3 may be received. As indicated at 510, different respective input data to a trained machine learning model that cause the trained machine learning model to generate incorrect results corresponding to the different respective input data may be identified, in some embodiments. For example, as discussed above with regard to FIG. 1A and Algorithm 1, and below with regard to FIG. 6, input data may be selected according to various sampling techniques in the latent space and the evaluated to determine whether the input data would provoke an incorrect result by the trained machine learning model. For example, random selection of instances within latent space may be performed or an instance corresponding to a training data input may be perturbed to generate similar (but different) instances in latent space).

As indicated at 520, a clustering technique may be applied to group the different respective input data into one or more failure scenarios for the trained machine learning model, in some embodiments. For example, as discussed above with regard to FIG. 1A and Algorithm 1, a Gaussian mixture model may be used to aggregate similar ones of the input data together. This nonparametric Gaussian mixture model may produce a set of clusters centers defined by a mean and covariance matrix, in some embodiments. The cluster centers may be considered or used to identify failure scenarios to indicate that each of them is a high level summary of specific model failures, in some embodiments. For example, as discussed above various regions in latent space may be identified as corresponding to different model bugs.

As indicated at 530, respective truth labels for one or more failure examples generated for the one or more failure scenarios may be obtained, in some embodiments. For example, as discussed above with regard to FIG. 1A and Algorithm 2, a generative adversarial network (GAN) may be used to generate failure examples (of input data) that are similar to the failure scenarios identified above. These failure examples may be provided via an interface (e.g., as discussed above with regard to FIGS. 3-4 and below with regard to FIG. 7), so that an annotator can provide back truth labels for the failure examples. In some embodiments, examples of failure scenarios may be presented individually (e.g., example(s) from one failure scenario at a time for correction), such as an in IDE or other interface that supports automatic failure diagnosis and correction. In some embodiments, the examples of failure scenarios may be provided as a batch (e.g., in a file downloaded or stored to a previously specified location). In some embodiments, multiple annotators may be provided with the failure examples of the failure scenario. A confidence of received annotation may be determined by comparing, aggregating, or otherwise evaluating the responses from different annotators, such that a determination of a truth label may be made if the results from more than one annotator agree, in some embodiments. For example, a percentage of annotators that provided a same label for an example (or set of examples) may be determined. A minimum percentage of agreement may be used as a confidence threshold for accepting the provided truth label, in such scenarios.

As indicated at 540, the machine learning model may be retrained using the one or more failure examples with the respective truth labels to generate a corrected version of the machine learning model, in some embodiments. For example, as discussed above with regard to FIG. 1A, the failure examples and the original training data may be used to retrain the machine learning model by applying one or more techniques that tune the trained machine learning model to adjust various features of the trained machine learning model (e.g., weights of nodes in a Deep Neural Network) according to the updated training information provided by the failure. In some embodiments, cross entropy may be implemented as part of training. For example, the machine learning model may be tuned with a same loss term as was used to train the original machine learning model and an additional regularization term. This regularization term may be the cross entropy loss between samples from the failure mode and annotator label, in some embodiments.

Figure 6:
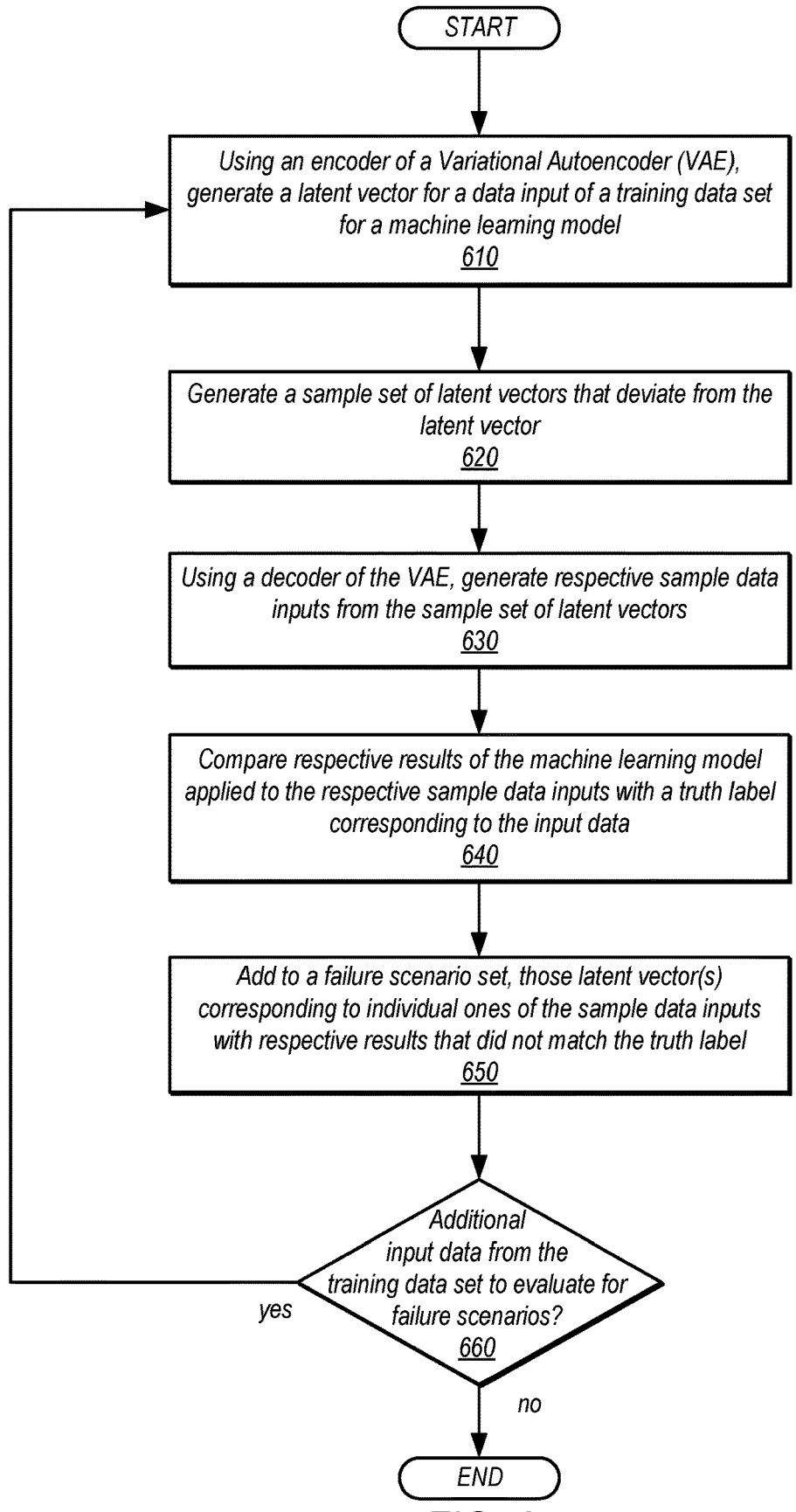
FIG. 6 illustrates a high-level flowchart of various methods and techniques to implement determining possible failure scenarios for a machine learning model, according to some embodiments.

FIG. 6 illustrates a high-level flowchart of various methods and techniques to implement determining possible failure scenarios for a machine learning model, according to some embodiments, such as those techniques discussed above with regard to FIG. 1. As indicated at 610, an encoder of a Variational Autoencoder (VAE) may be used to generate a latent vector for a data input of a training data set for a machine learning model, in some embodiments. For example, the VAE may be implemented using an encoder and decoder implemented as neural networks and trained to learn an encoding-decoding scheme that will encode input data into latent space which can then be decoded and may also allow data generated in the latent space (e.g., to generate failure examples similar to found failure scenarios) which can then be decoded as examples.

As indicated at 620, a sample set of latent vectors that deviate from the latent vector may be generated. For example, a hyperparameter, such as Beta, may be used for the VAE which may affect latent channel capacity with respect to independence constraints in order to maximize the probability of generating the real data while keeping the distance between the real and estimated data under a threshold value, as discussed above. In other embodiments, different sampling techniques may be implemented. For example, in some embodiments, random sampling of the latent vector space for the VAE may be performed to determine a set of latent vectors for identifying failure scenarios. As indicated at 630, a decoder of the VAE may be trained to generate respective sample data inputs from the sample set of latent vectors.

As indicated at 640, respective results of the machine learning models applied to the respective sample data inputs with a truth label corresponding to the input data, in various embodiments. For example, a truth label may be stored along with the data input. A respective inference may be generated using the machine learning model for each of the sample data inputs. The inferences may then be compared with the truth label to determine whether the machine learning model failed to provide the correct inference that matches the truth label. As indicated at 650, those latent vector(s) corresponding to sample data inputs with results that did not match the truth label, may be added to a failure scenario set, in some embodiments. For example, a set of latent vector(s) may be stored for a clustering analysis, as discussed above, which may be used to distill failure scenarios. In some embodiments, identified failure examples may be stored in other formats in addition to or instead of latent vectors (e.g., decoded into examples, which may be then provided for annotation without distillation). As indicated at 660, if additional input data from the training data set is still to be evaluated, then elements 610 through 650 may be repeated until no further additional input data remains to be considered for failure scenarios. In some embodiments, the various elements of FIG. 6 may performed in parallel fashion (e.g., with different nodes, servers, clusters, or computing resources evaluating different portions of a training data set in order to identify latent vectors for failure scenario identification).

Figure 7:
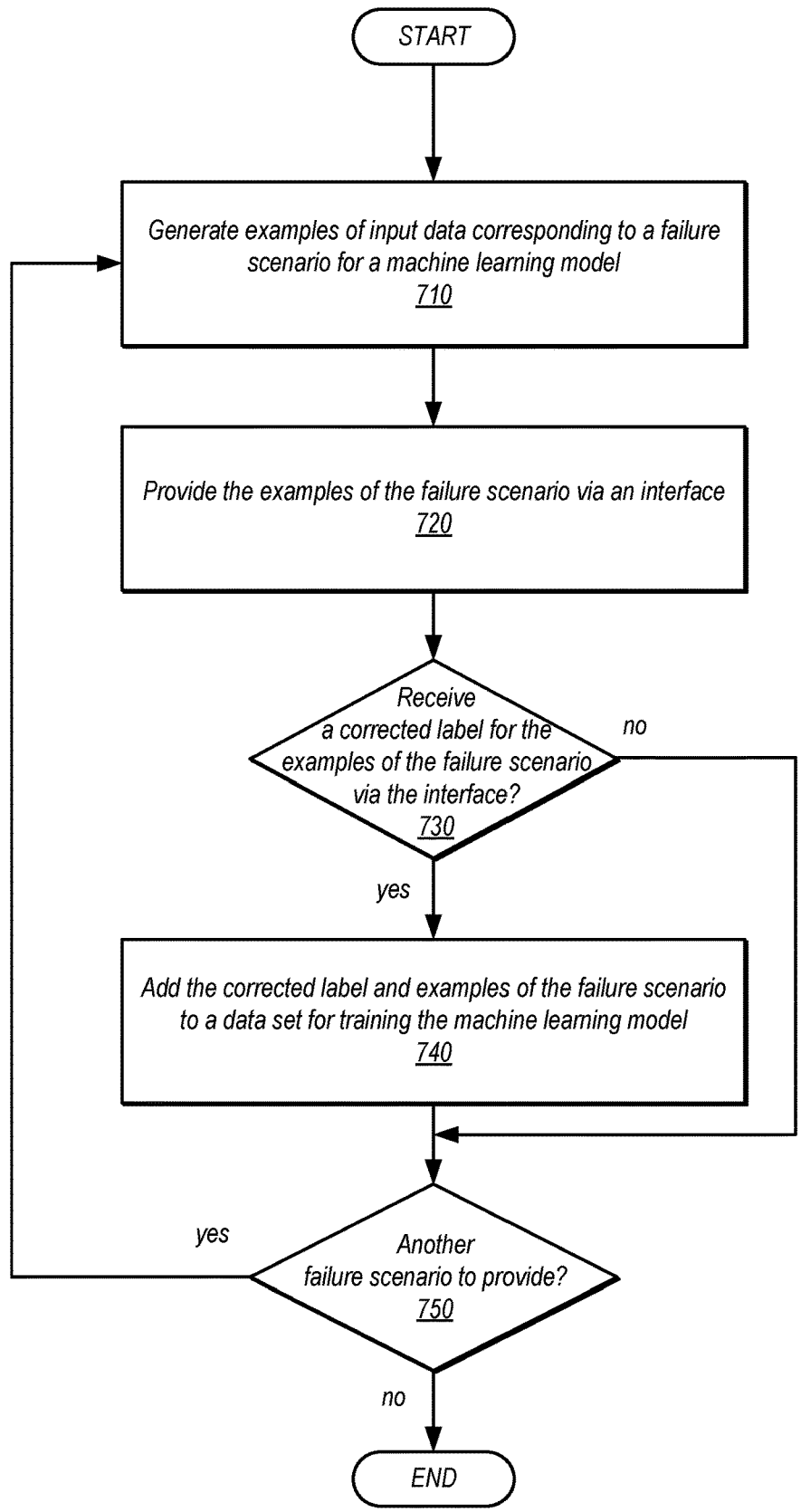
FIG. 7 illustrates a high-level flowchart of various methods and techniques to implement generating examples for obtaining corrected labels for machine learning models, according to some embodiments.

As discussed above with regard to FIG. 1A and FIG. 5, failure scenarios may be determined from the identified examples of input data that would produce erroneous, failing, or otherwise incorrect results when evaluated using the machine learning model. In this way, failure scenarios that are likely (e.g., with some minimum level of probability) may be used for correcting the trained machine learning model. FIG. 7 illustrates a high-level flowchart of various methods and techniques to implement generating examples for obtaining corrected labels for machine learning models, according to some embodiments, such as the techniques described above with regard to Algorithms 2 or 3.

As indicated at 710, examples of input data corresponding to a given failure scenario of a machine learning model may be generated, in some embodiments. Latent vectors may be generated from a failure scenario as represented by a latent vector in latent space generated by a VAE, in some embodiments. The vectors may deviate or vary from the failure scenario representation within a threshold, in some embodiments. To generate the examples of input data, the latent vectors may be decoded using a decoder of the VAE to produce the input data (e.g., an image that displays the failure scenario).

As indicated at 720, the examples of the failure scenario may be provided via an interface, in some embodiments. For example, a visual interface may be utilized to display the generated examples. Other examples generated for other types of data (e.g., audio) may be provided via a corresponding interface for the other types of data. In some embodiments, the number, layout, and/or other configuration of examples for the failure scenario may be specified in a configuration for performing automatic diagnosing and correction (e.g., providing one example at a time or a group of examples in a batch, as illustrated in FIG. 1B). As noted above, in some embodiments, a current label may be provided along with the failure examples.

In various embodiments, the interface may support a feedback element (e.g., a text input, drop-down menu, etc.), which may allow a user to provide a truth label to correct the example failure scenarios. As indicated at 730, a response may be received which may either indicated a corrected label, as indicated by the positive exit from 730 (or not as indicated by the negative exit from 730). For corrected labels, the corrected label and examples to which it applies may be added to a data set for training the machine learning model, as indicated at 740. For example, a training data set may be accessed, appended, inserted, or otherwise modified to include the label and examples. In some embodiments, a separate training or tuning data file, object or set which may be used as part of a larger data set for training the machine learning model may be updated (or created) with the corrected label and examples. Such techniques may continue, as indicated at 750, until no more failure scenarios remain to provide, in some embodiments.

The methods described herein may in various embodiments be implemented by any combination of hardware and software. For example, in one embodiment, the methods may be implemented on or across one or more computer systems (e.g., a computer system as in FIG. 8) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
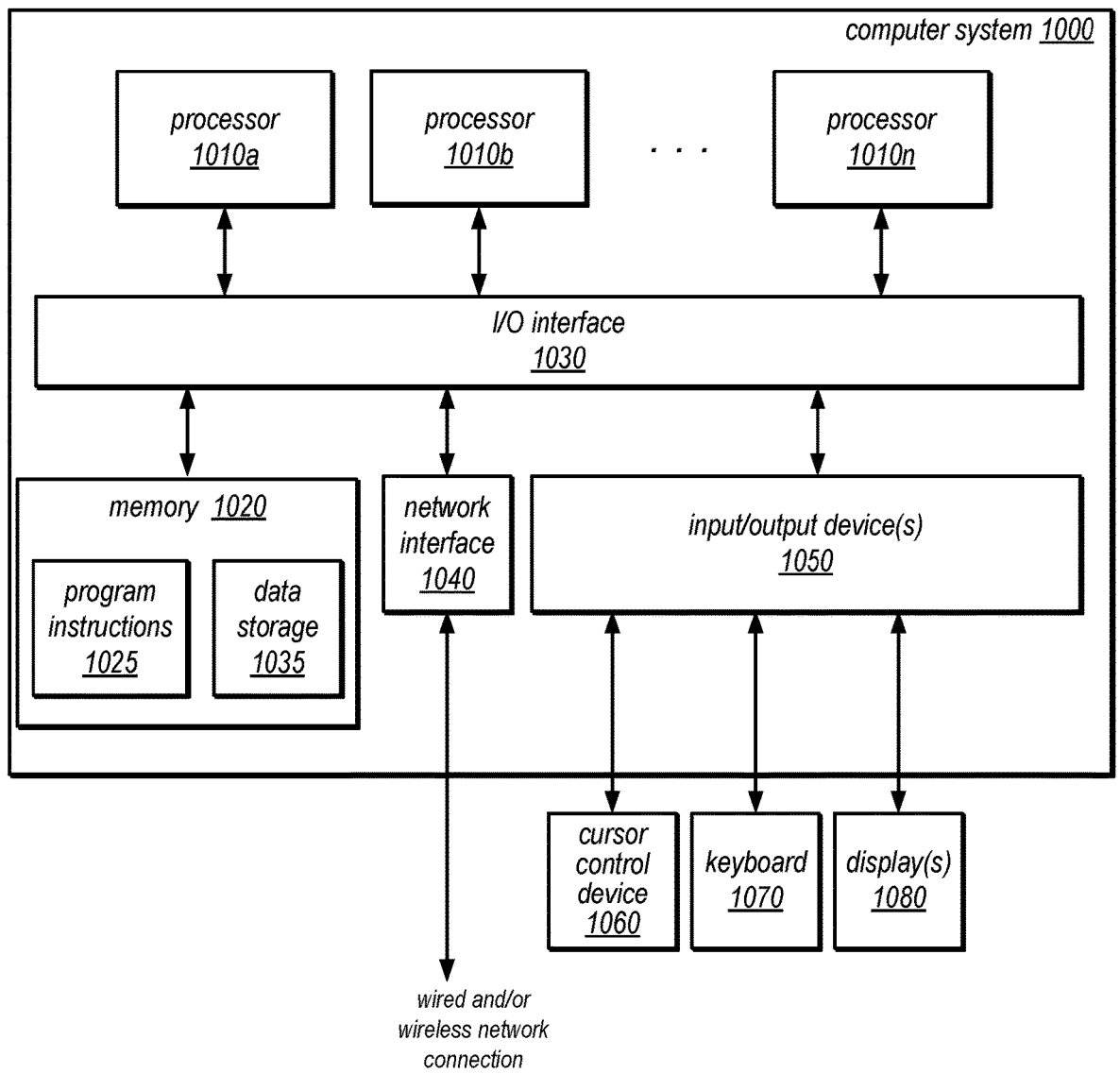
FIG. 8 illustrates an example system to implement the various methods, techniques, and systems described herein, according to some embodiments.

Embodiments of automatic failure diagnosis and correction in machine learning models as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions of techniques for automatically diagnosing and correcting machine learning models, such as those implemented as part of a machine learning service described above may be stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to:
      responsive to a request received via an interface for a machine learning system that causes automatic failure diagnosis for a trained machine learning model:
         identify different respective input data to the trained machine learning model that cause the trained machine learning model to generate incorrect results corresponding to the different respective input data;
         apply a clustering technique to group the different respective input data into one or more failure scenarios for the trained machine learning model, wherein the one or more failure scenarios correspond to respective regions in a latent space of the trained machine learning model;
         generate a plurality of respective failure examples for the one or more failure scenarios;
         obtain a respective truth label for one of the plurality of respective failure examples via the interface, wherein the respective truth label for the one of the plurality of respective failure examples applies to other ones of the plurality of respective failure examples generated from a same one of the respective regions in the latent space; and
         tune the trained machine learning model using the plurality of respective failures examples for the one or more failure scenarios with the respective truth label for the one of the plurality of respective failure examples that applies to other ones of the plurality of respective failure examples to generate a corrected version of the trained machine learning model.

2. The system of claim 1, wherein to identify the different respective input data to the trained machine learning model that cause the trained machine learning model to generate incorrect results corresponding to the different respective input data, the program instructions cause the at least one processor to:
   use an encoder of a Variational Autoencoder (VAE) to generate a latent vector for an input data of a training data set for the trained machine learning model;
   generate a set of latent vectors that deviate from the latent vector;
   use a decoder of the VAE to generate respective sample data inputs from the set of latent vectors;
   compare respective results of the trained machine learning model applied to the respective sample data inputs with a truth label corresponding to the input data of the training data set;
   based on the comparing, add those latent vectors of the set of latent vectors with the respective results that do not match the truth label to a failure scenario evaluation set; and
   wherein the failure scenario evaluation set is the different respective input data to which the clustering technique is applied.

3. The system of claim 1, wherein to obtain the respective truth label for the plurality of respective failure examples via the interface, the program instructions cause the at least one processor to:
   provide at least one of the plurality of respective failure examples via the interface; and
   receive, via the interface, the respective truth label for the at least one of the plurality of respective failure examples.

4. The system of claim 1, wherein the machine learning system is a machine learning service implemented as part of a provider network and wherein the interface is an integrated development environment (IDE) implemented by the machine learning system.

5. A method, comprising:
   identifying different respective input data to a trained machine learning model that cause the trained machine learning model to generate incorrect results corresponding to the different respective input data;
   applying a clustering technique to group the different respective input data into one or more failure scenarios for the trained machine learning model, wherein the one or more failure scenarios correspond to respective regions in a latent space of the trained machine learning model;
   obtaining a respective truth label for one of a respective plurality of failure examples generated for the one or more failure scenarios, wherein the respective truth label for the one of the plurality of respective failure examples applies to other ones of the plurality of respective failure examples generated from a same one of the respective regions in the latent space; and
   retraining the trained machine learning model using the plurality of respective failures examples for the one or more failure scenarios with the respective truth label for the one of the plurality of respective failure examples that applies to other ones of the plurality of respective failure examples to generate a corrected version of the trained machine learning model.

6. The method of claim 5, wherein obtaining the respective truth labels for the one or more failure examples generated for the one or more failure scenarios comprises:

providing at least one of the plurality of respective failure examples via an interface; and receiving, via the interface, the respective truth label for the at least one of the plurality of respective failure examples.

7. The method of claim 6, wherein a respective current label as determined by the trained machine learning model for the at least one of the plurality of respective failure examples is provided with the at least one of the plurality of respective failure examples via the interface.

8. The method of claim 5, wherein the plurality of respective failure examples are generated using a decoder of a Variable Autoencoder (VAE) applied to respective different respective latent codes sampled from the same region of the latent space.

9. The method of claim 5, wherein identifying the different respective input data to the trained machine learning model that cause the trained machine learning model to generate incorrect results corresponding to the different respective input data comprises:
   using an encoder of a Variational Autoencoder (VAE) to generate a latent vector for an input data of a training data set for the trained machine learning model;
   generating a set of latent vectors that deviate from the latent vector;
   using a decoder of the VAE to generate respective sample data inputs from the set of latent vectors;
   comparing respective results of the trained machine learning model applied to the respective sample data inputs with a truth label corresponding to the input data of the training data set;
   based on the comparing, adding those latent vectors of the set of latent vectors with the respective results that do not match the truth label to a failure scenario evaluation set; and
   wherein the failure scenario evaluation set is the different respective input data to which the clustering technique is applied.

10. The method of claim 5, wherein identifying the different respective input data to the trained machine learning model that cause the trained machine learning model to generate incorrect results corresponding to the different respective input data comprises randomly sampling vectors from a latent vector space determined using a trained Variational Autoencoder (VAE).

11. The method of claim 5, further comprising receiving, via an interface, a request to perform automatic diagnosis and correction for the trained machine learning model and wherein the identifying, the applying, the obtaining, and the retraining are performed in response to the request.

12. The method of claim 5, wherein retraining the trained machine learning model using the plurality of respective failure examples for the one or more failure scenarios with the respective truth labe to generate the corrected version of the trained machine learning model comprises applying an additional regularization term that is a cross entropy loss between the plurality of respective failure examples and the respective truth label.

13. The method of claim 5, wherein the trained machine learning model is an image classification model and wherein the one or more failure examples are generated as different respective images.

14. One or more non-transitory, computer-readable storage media, storing program instructions that when executed on or across one or more computing devices cause the one or more computing devices to implement:

identifying different respective input data to a trained machine learning model that cause the trained machine learning model to generate incorrect results corresponding to the different respective input data;

applying a clustering technique to group the different respective input data into one or more failure scenarios for the trained machine learning model, wherein the one or more failure scenarios correspond to respective regions in a latent space of the trained machine learning model;

generating a plurality of respective failure examples for the one or more failure scenarios;

obtaining a respective truth label for one of the plurality of respective failure examples generated for the one or more failure scenarios, wherein the respective truth label for the one of the plurality of respective failure examples applies to other ones of the plurality of respective failure examples generated from a same one of the respective regions in the latent space; and retraining the trained machine learning model using the plurality of respective failures examples for the one or more failure scenarios with the respective truth label for the one of the plurality of respective failure examples that applies to other ones of the plurality of respective failure examples to generate a corrected version of the trained machine learning model.

15. The one or more non-transitory, computer-readable storage media of claim 14, wherein, in obtaining the respective truth labels for the one or more failure examples generated for the one or more failure scenarios, the program instructions cause the one or more computing devices to implement:
   displaying at least one of the plurality of respective failure examples via an interface; and
   receiving, via the interface, the respective truth label for the at least one of the plurality of respective failure examples.

16. The one or more non-transitory, computer-readable storage media of claim 15, wherein a respective current label as determined by the trained machine learning model is provided with the at least one of the plurality of respective failure examples via the interface.

17. The one or more non-transitory, computer-readable storage media of claim 14, wherein, in identifying the different respective input data to the trained machine learning model that cause the trained machine learning model to generate incorrect results corresponding to the different respective input data, the program instructions cause the one or more computing devices to implement:
   using an encoder of a Variational Autoencoder (VAE) to generate a latent vector for an input data of a training data set for the trained machine learning model;
   generating a set of latent vectors that deviate from the latent vector;
   using a decoder of the VAE to generate respective sample data inputs from the set of latent vectors;
   comparing respective results of the trained machine learning model applied to the respective sample data inputs with a truth label corresponding to the input data of the training data set;
   based on the comparing, adding those latent vectors of the set of latent vectors with the respective results that do not match the truth label to a failure scenario evaluation set; and
   wherein the failure scenario evaluation set is the different respective input data to which the clustering technique is applied.

18. The one or more non-transitory, computer-readable storage media of claim 14, storing further instructions that when executed on or across the one or more computing devices, cause the one or more computing devices to implement receiving, via an interface, a request to perform a training job that generates the trained machine learning model and wherein the identifying, the applying, the generating, the obtaining, and the retraining are performed as part of executing the training job.

19. The one or more non-transitory, computer-readable storage media of claim 14, wherein, in retraining the trained machine learning model using plurality of respective failures examples for the one or more failure scenarios with the respective truth label for the one of the plurality of respective failure examples that applies to other ones of the plurality of respective failure examples to generate a corrected version of the trained machine learning model, the program instructions cause the one or more computing devices to implement applying an additional regularization term that is a cross entropy loss between the plurality of respective failure examples and the respective truth label.

20. The one or more non-transitory, computer-readable storage media of claim 14, wherein the one or more computing devices are implemented as part of a machine learning service offered by a provider network and wherein the machine learning service hosts the corrected machine learning to perform respective inferences using the corrected machine learning model responsive to one or more requests directed to the corrected machine learning model.

* * * * *